US009398320B1

(12) United States Patent
Upadhyay et al.

(10) Patent No.: US 9,398,320 B1
(45) Date of Patent: Jul. 19, 2016

(54) MANAGING ACCESS TO CONTENT USING RATINGS PROVIDED BY A CONTENT PROVIDER

(75) Inventors: Piyush Upadhyay, Overland Park, KS (US); Badri P. Subramanyan, Overland Park, KS (US); John W. Davis, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 815 days.

(21) Appl. No.: 12/432,415

(22) Filed: Apr. 29, 2009

(51) Int. Cl.
*H04N 7/16* (2011.01)
*H04N 21/258* (2011.01)

(52) U.S. Cl.
CPC ................................ *H04N 21/25891* (2013.01)

(58) Field of Classification Search
None
See application file for complete search history.

(56) References Cited

U.S. PATENT DOCUMENTS

| 8,150,875 B1 * | 4/2012 | Dubrovsky et al. ............ 707/783 |
| 2008/0172689 A1 * | 7/2008 | Feder et al. ..................... 725/28 |
| 2008/0184284 A1 * | 7/2008 | O'Hern ........................... 725/28 |
| 2009/0125935 A1 * | 5/2009 | Nishikawa et al. ............. 725/28 |
| 2009/0132718 A1 * | 5/2009 | Groll et al. .................... 709/229 |
| 2009/0204984 A1 * | 8/2009 | Nagai ............................. 725/25 |
| 2011/0276993 A1 * | 11/2011 | Ferguson ........................ 725/30 |

OTHER PUBLICATIONS

Sprint Communications Company L.P., U.S. Appl. No. 12/099,220, filed Apr. 8, 2008, Inventors: Geoff Martin and Johnthan Kindred, Ratings-Based Digital Media Distribution for a Wireless Network, 15 pages.

* cited by examiner

*Primary Examiner* — Brian T Pendleton
*Assistant Examiner* — Dika Okeke (57) ABSTRACT

A method, system, and computer-readable media having computer-executable instructions for blocking online content based on ratings supplied by the content provider are provided. A content server may communicate a content rating for online content in a response to a request for the online content. The content rating may be communicated as an attribute value within the response header. The content rating may be compared to the rating-permission for the computing device that requested the online content to determine whether the content should be blocked. If the computing device that sent the request is not approved to receive the online content then the online content is blocked.

16 Claims, 6 Drawing Sheets

MANAGING ACCESS TO CONTENT USING RATINGS PROVIDED BY A CONTENT PROVIDER

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, computer-readable media having computer-executable instructions embodied thereon that, when executed, perform a method of providing a content rating that enables a requesting computing device to restrict user access to the requested digital content using the content rating are provided. The method includes, at a content server, receiving the digital content from a digital-content provider and receiving the content rating associated with the digital content that indicates a nature of the digital content. The method also includes storing the content rating in a ratings database in a memory coupled to the content server. The method further includes, from a requesting computing device, receiving a request for the digital content. The method also includes generating a response that includes the content rating associated with the digital content. The method also includes communicating the response to the requesting computing device, such that the requesting computing device is able to restrict user access to the digital content using the content rating.

In another illustrative embodiment, computer-readable media having computer-executable instructions embodied thereon that, when executed, perform a method that determines whether a particular content should be communicated to a mobile device based on a content rating supplied by a provider of the particular content and a rating permission associated with the mobile device are provided. The method includes receiving, at a computing device, a request for a content from a web browser operating on the mobile device and communicating the request to a content server that supplies the content. The method also includes receiving, at the computing device, a response to the request from the content server that includes the content rating for the content. The method further includes retrieving rating-permission data for the mobile device from a device-profile data store embodied on one or more computer-readable media coupled to the computing device. The method further includes determining, based on the rating-permission data and the content rating provided by the content server, that the content should not be sent to the mobile device and preventing the mobile device from receiving the content.

In a third illustrative embodiment, computer-readable media having computer-executable instructions embodied thereon that, when executed, perform a method that allows a gateway to block a media object requested by a web browser operating on a mobile device based on a content rating supplied by a content provider that provided the media object are provided. The method includes receiving, at the gateway, a request for the media object from the web browser operating on the mobile device. The gateway is a computing device that acts as an interface between mobile devices connected to a radio-access network and computing devices on a public network. The method also includes communicating the request to a content server that supplies the media object. The method also includes receiving, at the gateway, a response from the content server that includes the content rating for the media object and retrieving rating-permission data for the mobile device from a device-profile data store embodied on one or more computer-readable media. The method further includes determining, based on the rating-permission data for the mobile device and the content rating provided by the content server, that the media object should not be sent to the mobile device and preventing the user from receiving the media object, thereby preventing a user of the mobile device from accessing the media object based on the content rating.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention provide a system and method for managing access to media content based on content ratings provided by the content provider. The content rating on the media may be matched with a rating permission for an individual user to determine whether the user is allowed to receive the requested content. The rating permissions and the content ratings on the media may be based on available rating systems such as those used to rate movies or videogames, or on any other system of ratings. In one embodiment, the content rating for a requested content is transmitted as an attribute value in a header within a response to a request for the content. A ratings component responsible for controlling a user's access to content will then compare the content rating in the header to the ratings permission data for the device that requested the content. If the content is deemed restrictive, the device may be notified that the requested content is restricted. The requested content may be a web page, a video, a picture, or other object that is part of a web page.

Throughout the description of embodiments of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of embodiments of the present invention.

| | |
|---|---|
| API | Application Interface |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile-communications |
| LAN | Local Access Network |
| PDA | Personal Digital Assistant |
| PDSN | Packet Data Serving Node/Home Agent |
| RAM | Random Access Memory |
| ROM | Read Only Memory |
| SMS | Short Messaging Service |
| SMSC | Short Messaging Service Center |
| SIP | Session Initiation Protocol |
| TDMA | Time Division Multiple Access |

Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

Figure 1:
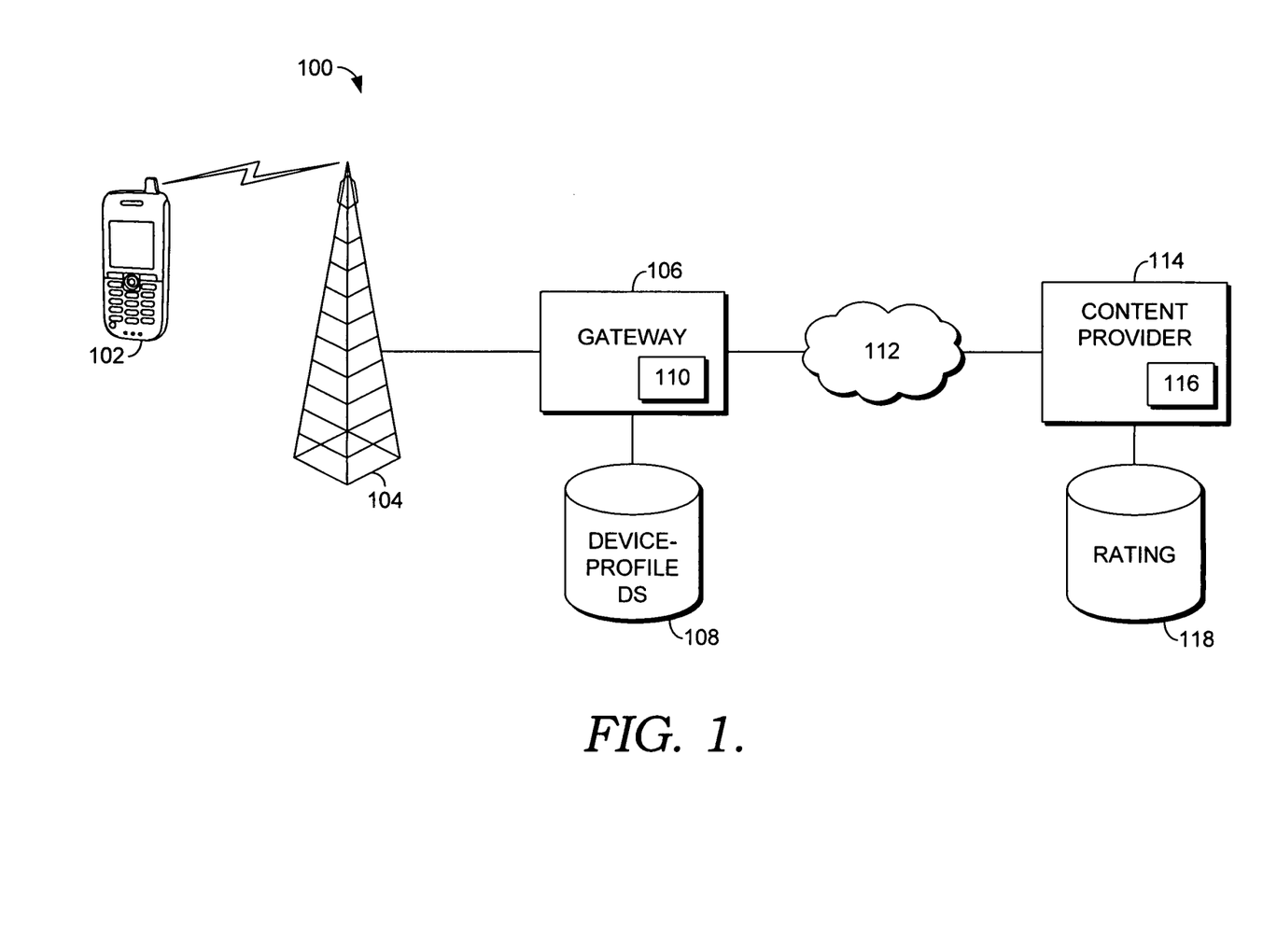
FIG. 1 is a block diagram of an illustrative environment in which an embodiment of the present invention may operate.

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes a mobile device 102, a base station 104, a gateway 106, a device-profile data store 108, a rating-comparison component 110, a network 112, a content server 114, a ratings-retrieval component 116, and a ratings data store 118. The components shown in FIG. 1 are a few of the components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and are not meant to be limiting.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of accessing content over the Internet. Examples of content that may be received include text messages, multimedia messages, emails, calendar updates, web pages, videos, pictures, and task reminders.

The mobile device 102 may be associated with a user. For example, a text message sent to mobile device 102 would be intended for the user. The user is the ultimate recipient of communications (e.g., emails, phone calls, text messages) and media content sent to mobile device 102.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Gateway 106 provides a boundary between radio communication functions embodied in one or more radio-access systems that form the access-facing portion of illustrative operating environment 100 and the standard internet protocol ("IP") communication functions (including Mobile IP) embodied in the public-network facing portion (e.g., network 112) of illustrative operating environment 100. Access gateway 106 might be, for example, an ASN-GW, a PDSN, a SGSN/GGSN, and the like. The gateway 106 includes is a computing device that may include a CPU, short-term memory, long-term memory, and one or more network interfaces. The network interfaces are used to communicate data between the network 112 and devices, such as mobile device 102, connected to the access-facing portion of illustrative operating environment 100. A network interface to the WAN or LAN could be wired, wireless, or both. In one embodiment, the gateway 106 receives requests from mobile devices connected to the radio-access network associated with the gateway 106. The gateway 106 may modify the request to include authentication information and address information for the gateway 106 and forward the request to a content server, such as content server 114. In one embodiment, the request is an HTTP request. The gateway 106 may modify the HTTP request by adding address information for the gateway to the HTTP request header.

The device-profile data store 108 stores rating-permission data for users associated with the radio-access portion of illustrative operating environment 100. The device-profile data store may be a separate computing device or part of the gateway 106. In either case, the data within the device-profile data store 108 may be embodied on one or more computer-readable media. The device-profile data store 108 may store data in a relational database, table, series of tables, text files or other format. The device-profile data is matched with a particular mobile device through a unique identifier assigned to the mobile device. For example, each mobile device may be assigned a network access identifier ("NAI"). The device-profile data store 108 may store ratings permissions as well as other data, such as state information related to an ongoing communication session, associated with the mobile devices. In another embodiment, the device-profile data store only stores ratings-permission information.

The rating-permission data may be accessed by ratings-comparison component 110. In one embodiment, the ratings-comparison component 110 is located on the gateway 106. In another embodiment, the ratings-comparison component is a specialized computing device that interfaces with the gateway 106 to perform the functions described herein. The ratings-comparison component 110 may compare the rating-permission data for a particular user with the content rating for a requested content. If the user does not have access to the particular content based on the comparison of the content rating and the permission rating then the ratings-comparison component 110 instructs the gateway 106 to restrict access to the media content. Access may be restricted by redirecting the response to a URL that contains a "content restricted" message. Other methods of providing a restricted content notification to the user are also possible. In another embodiment, no notification is sent and the user is simply blocked from accessing the content.

Network 112 may include one or more mobile networks, one or more packet-based networks, including the Internet, and the public-switched telephone network ("PSTN"). The various components within network 112 may be owned and/or operated by multiple entities, commercial or otherwise. Network 112 is configured to transmit a variety of communication formats including phone calls, emails, text messaging, faxes, instant messaging, pages, voice mails, photographs, audio files, web pages, videos, movies, TV shows, calendar reminders, task reminders, and other files containing communicative content.

The content server 114 is stores media content and communicates it to a user upon receiving a request for the media. The content server 114 includes a computing device that may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, the content server 114 facilitates transmission of media content (e.g. movies, web pages, videos, MP3s, etc.) to mobile device 102. The content server 114 transmits the media content over the packet-switched network 112. The content server 114 may also host web pages that are transmitted to a requesting device. Content server 114 may be affiliated with a content provider that produces, generates, or maintains the media content on the content server 114.

In response to receiving a request for content hosted by the content server 114, the content server may send a response to the requesting component. The response may include a content rating for the requested content. In one embodiment, the content rating is communicated as an attribute value in the response header. The content rating may be retrieved from a ratings data store 118 by a ratings-retrieval component 116 operating on the content server 114. The ratings-retrieval component 116 may then communicate the retrieved response to the device that requested the content.

The ratings data store 118 stores content ratings for media content distributed by the content server 114. The ratings data store 118 may be a database stored on the content server, or it may be stored on a separate computing device and accessed by the content server 114. Ratings may be assigned on an object-by-object basis. Ratings may also be assigned to all objects in a particular folder or file path. For example, a content rating could be assigned to a folder. That content rating would then be associated with all objects in the folder.

Figure 2:
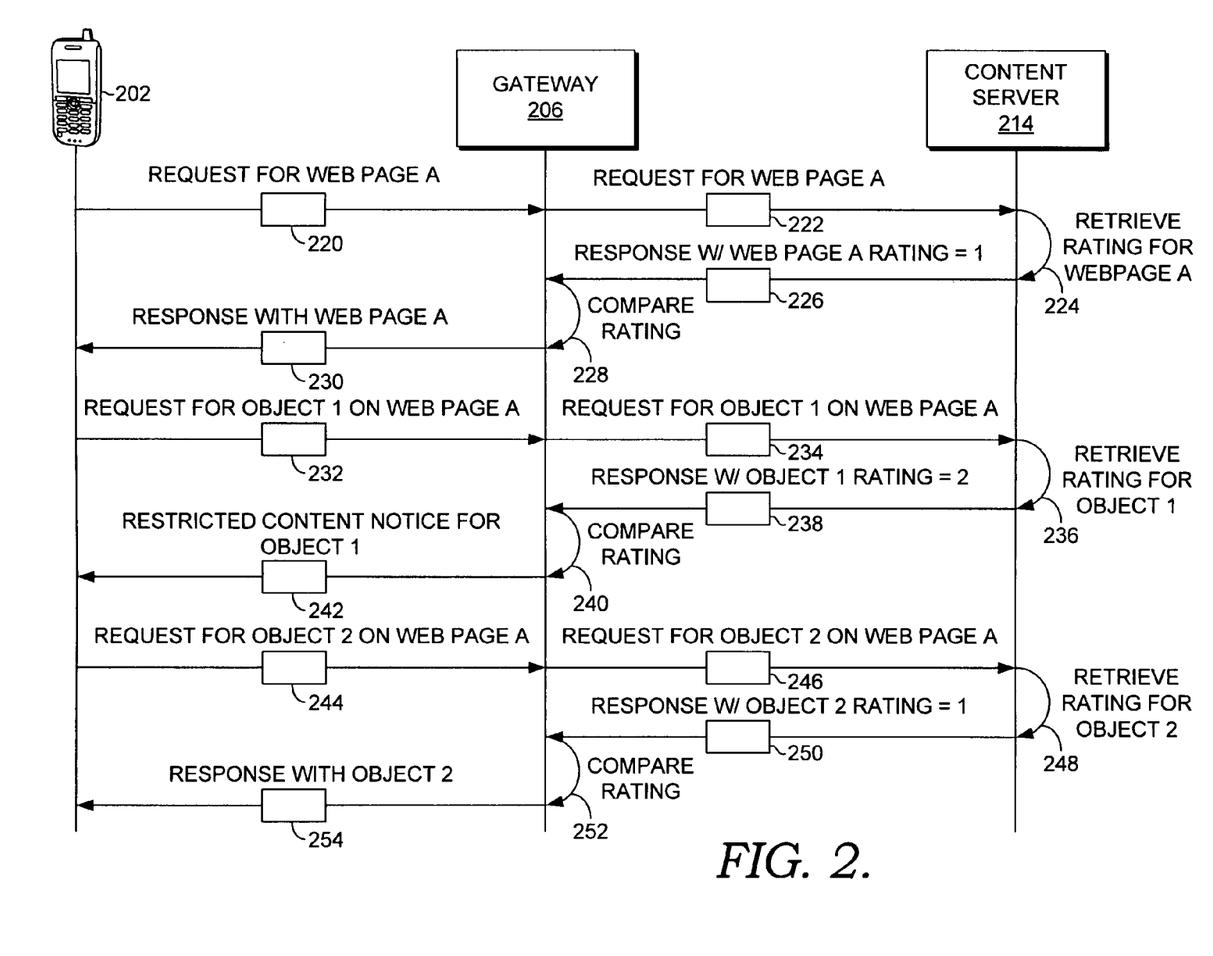
FIG. 2 is a flow diagram that illustrates communications occurring to enable content to be restricted based on ratings provided by the content provider, in accordance with an embodiment of the present invention.

Turning now to FIG. 2, communications occurring while managing access to content-based ratings provided by the content provider are illustrated, in accordance with an embodiment of the present invention. The mobile device 202 may be similar to the mobile device 102 described previously with reference to FIG. 1. The gateway 206 may be similar to the gateway 106 described previously with reference to FIG. 1. The content server 214 may be similar to the content server 114 described previously with reference to FIG. 1.

Initially, a request for web page A 220 is sent from a browser associated with the mobile device 202 to the gateway 206. The request for web page A 220 may be an HTTP Get request. The request for web page A 220 may be initiated by a user of the mobile device 202 entering a URL into a web browser operating on the mobile device 202. The actual request for the web page A 220 may be generated by the web browser operating on the mobile device 202. As used throughout the description of FIG. 2, "web page A" could be any web page.

The gateway 206 receives the request for web page A 220 and may modify it to generate a new request for web page A 222 that is sent to the content server 214. The new request for web page A 222 may, in many respects, contain the same information as the request for web page A 220. However, the gateway 206 may modify the request for web page A 220 by adding additional header information, such as authentication or addressing information for the gateway 206, to create a slightly different content for the new request for web page A 222. Both the request for web page A 220 and the new request for web page A 222 include identification information for the specific media content that is requested.

Upon receiving the new request 222, the content server 214 may retrieve the content and may retrieve 224 a rating for web page A. The rating for web page A may be retrieved 224 from a ratings data store that has been populated with the information by the content provider associated with web page A. In one embodiment, web pages as a whole are rated for content. In another embodiment, individual objects, such as pictures and videos, within a web page are individually rated. In another embodiment, both web pages and objects on the web page are rated and may have different ratings. Web pages and objects may be rated individually or by the folders or the directories in which they are stored by the content server 214.

The content server 214 communicates a response 226 to the gateway 206. The response 226 includes the retrieved content rating for web page A. In FIG. 2, the content rating for web page A is illustrated as "1." The response 226 may also include the web page A content. The web page A content may be the HTML and other coding that is executed to render the web page.

Upon receiving the response 226 the gateway 206 compares 228 the rating associated with web page A, in this case "1," with ratings-permission data associated with the mobile device 202. Mobile devices may be assigned ratings permissions by users of the mobile device or affiliates of users of the mobile device. For example, parents of the user of the mobile device may provide rating permissions for content that may be accessed by the mobile device 202. Similarly, corporations providing mobile devices to their employees may restrict content accessed by employees by using rating permissions. In this case, the gateway 206 evaluates the ratings permission for the mobile device 202 to determine if content with a rating of "1" is allowable. In this case, for the sake of illustration, the mobile device 202 is determined to have access to content with a rating of "1."

Figure 4:
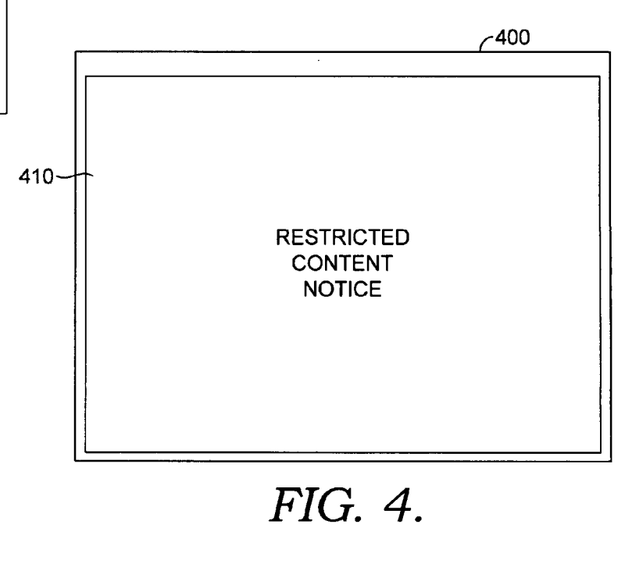
FIG. 4 depicts an exemplary user interface that illustrates the display of a restricted-content notice by browser instead of the requested web-page, which contains restricted content, in accordance with an embodiment of the present invention.

Because the mobile device 202 has an acceptable rating permission to access web page A, a response 230 with web page A is sent to the mobile device 202. Had the mobile device 202 not had an acceptable ratings permission to access web page A, a notification may be sent instead of the response 230 indicating that the mobile device 202 is restricted from accessing web page A. This may be accomplished by redirecting the mobile device to a generic web page containing the notification. FIG. 4 illustrates a potential display when a user is denied access to an entire web page. FIG. 4 shows a browser window 400 containing a notice of restricted content 410. The notice of restricted content 410 may be shown when the requested web page is associated with a content rating that the mobile device 202 is not allowed to access.

Continuing now with FIG. 2, as a result of receiving the response 230, the mobile device 202 may display the web page to the user. When rendering the web page, the browser on the mobile device 202 may need to make requests for additional objects, such as pictures or videos, that are on the web page. Each request sent by the mobile device may go through the same series of steps and evaluations that were required for the initial request for web page A. As described previously, the web page may be assigned a different rating than objects on the web page.

Thus, request for object 1 on page A 232 is transmitted from the mobile device 202 to the gateway 206. As describe previously, the request 232 may be an HTTP Get request and may be generated by a browser operating on the mobile device 202. The request 232 is received by the gateway 206 and may be modified, as described previously, to generate the new request for object 1 on page A 234. The new request 234 is sent from the gateway 206 to the content server 214. Upon receiving the new request 234 for object 1 on page A, the content server 214 retrieves the object, and retrieves 236 the rating for object 1. A response 238 with the rating information for object 1 is then transmitted from the content server 214 to the gateway 206. In this case, the rating for object 1 is illustrated as "2." In one embodiment, the response it an HTTP 200 response.

Upon receiving the response 238, the rating for object 1 is compared 240 with the rating-permissions data for the mobile device 202. In this case, for the sake of illustration, the mobile device 202 is determined not to have permission to access content associated with a rating of "2." Upon making this determination, a restricted content notice 242 for object 1 is sent from the gateway 206 to the mobile device 202.

Figure 3:
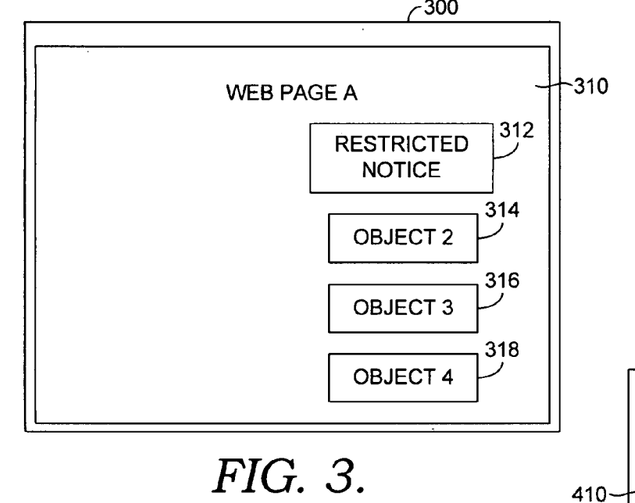
FIG. 3 depicts an exemplary user interface that illustrates a restricted-content notice for an object as part of a web page and displayable by a browser as part of rendering the web page in accordance with an embodiment of the present invention.

FIG. 3 illustrates how the restricted content notice may be displayed by a browser as part of rendering web page A, in accordance with an embodiment of the present invention.

FIG. 3 shows browser window 300 with the text portions of web page A 310 rendered. In the place of object 1, a restricted notice 312 appears. The restricted notice 312 may be a graphic stating that access is denied, the content is restricted, or other similar message. In another embodiment, the restricted notice 312 includes a specific reason why access is denied, such as object 1 contains material with a content rating to which user settings do not allow access. Object 2 314, object 3 316, and object 4 318 presumably are associated with acceptable content ratings and are rendered normally. Thus, FIG. 3 illustrates that the web page as a whole and some objects within the web page may be shown, while certain individual objects within the web page may be restricted.

Continuing now with FIG. 2, a request for object 2 244 is transmitted from the mobile device 202 to the gateway 206. The request 244 may be modified, as described previously, and communicated to the content server 214. Upon receiving new request 246, the content server 214 retrieves object 2 and retrieves 248 a rating for object 2. Both the rating and object 2 are transmitted to gateway 206 in response 250. In this case, the rating for object 2 is "1."

Upon receiving the response 250, gateway 206 may compare 252 the rating associated with the response 250 with the ratings-permission data associated with the mobile device 202. For the sake of illustration, the mobile device 202 is determined to have access to content associated with a content rating of "1." Upon making the determination that the mobile device 202 has access to object 2, the response 254 that includes object 2 is transmitted to the mobile device. The mobile device 202, or a browser on the mobile device 202, may then render object 2 in association with web page A.

Figure 5:
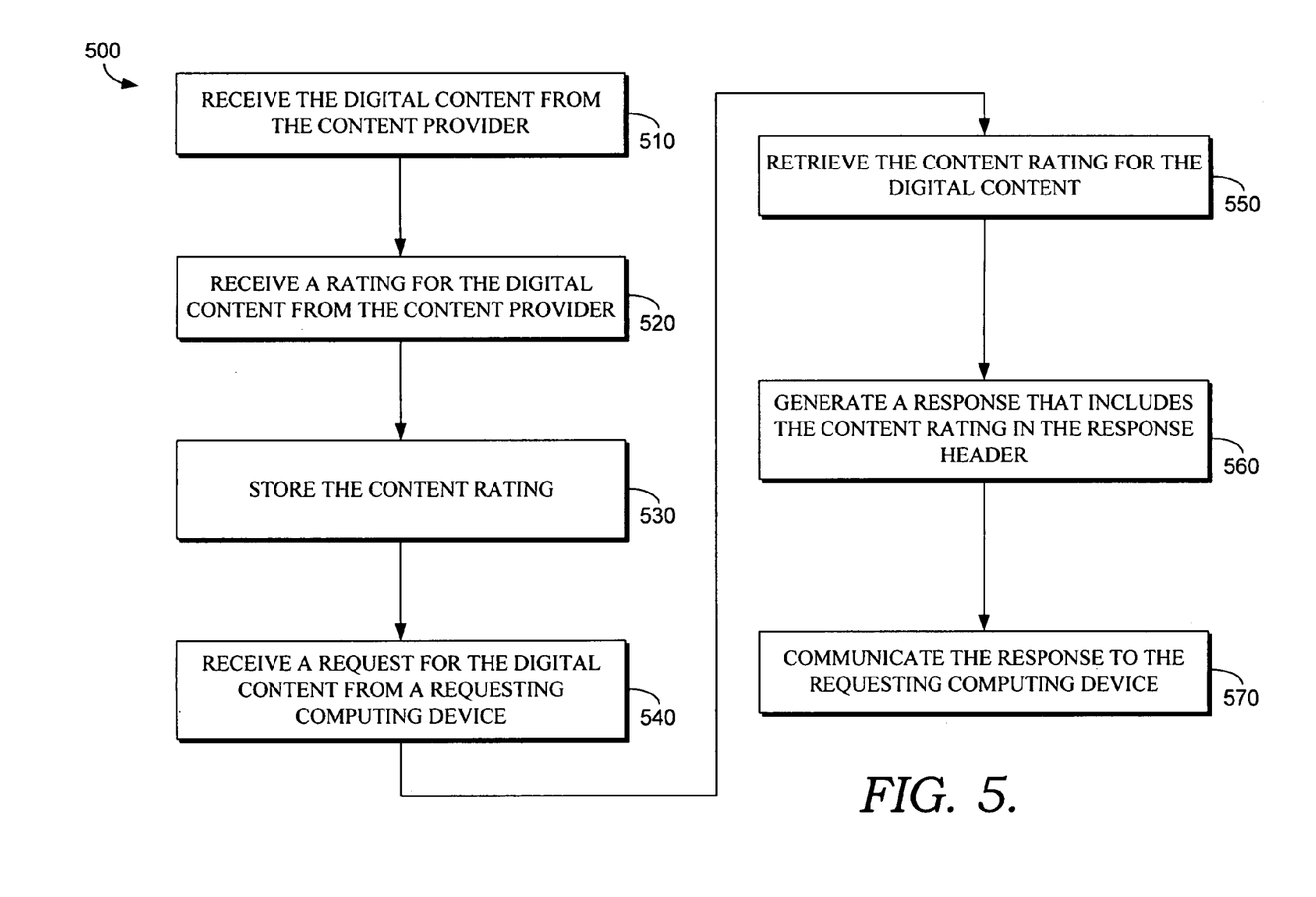
FIG. 5 is a flow diagram that illustrates a method of communicating digital content along with a content rating specified by the content's provider, in accordance with an embodiment of the present invention.

Turning now to FIG. 5, a flow diagram showing a method 500 of providing a content rating that enables a requesting computing device to restrict user access to the requested digital content using the content rating is shown, in accordance with an embodiment of the present invention. The digital content may include web pages, videos, and objects on web pages such as digital pictures. The content rating may communicate the age appropriateness of the content, or more specifically, rate the content based on certain characteristics. Examples of characteristics that may be used to rate the content include sexual content, profanity, violence, and any other characteristics that may be used to restrict access to content. In addition, known rating systems, such as those used to rate movies or video games or television shows, may be used to rate content. As stated, the content is rated by the provider of the content.

At step 510, the digital content is received from the content provider. The digital content may be received over a network interface, an input device, or by transferring it from a computer-readable media inserted into a device associated with a computing device that received the digital content. In one embodiment, the digital content is received by a content server connected to the Internet.

At step 520, a content rating for the digital content is received from the content provider. The content rating may be received by the content server. As described previously, the rating may reflect the characteristics or overall appropriateness of the content. Thus, the content and the rating for the content are received from the same entity, which is designated as the content provider.

At step 530, the content rating is stored in ratings database in a memory coupled to the content server. The rating may be stored in association with an individual content, or the rating may be associated with the digital content by placing the digital content into a file, folder, or directory that is pre-associated with a particular rating.

At step 540, the request for the digital content is received, at the content server, from a requesting computing device. In one embodiment, the request is an HTTP Get request. At step 550, the rating for the content requested in step 540 is retrieved from the data store. At step 560, a response is generated that includes the rating for the requested content in the response header. In one embodiment, the response also includes the requested content. The response may be an HTTP 200 response. At step 570, the response is communicated to the requesting computing device.

Figure 6:
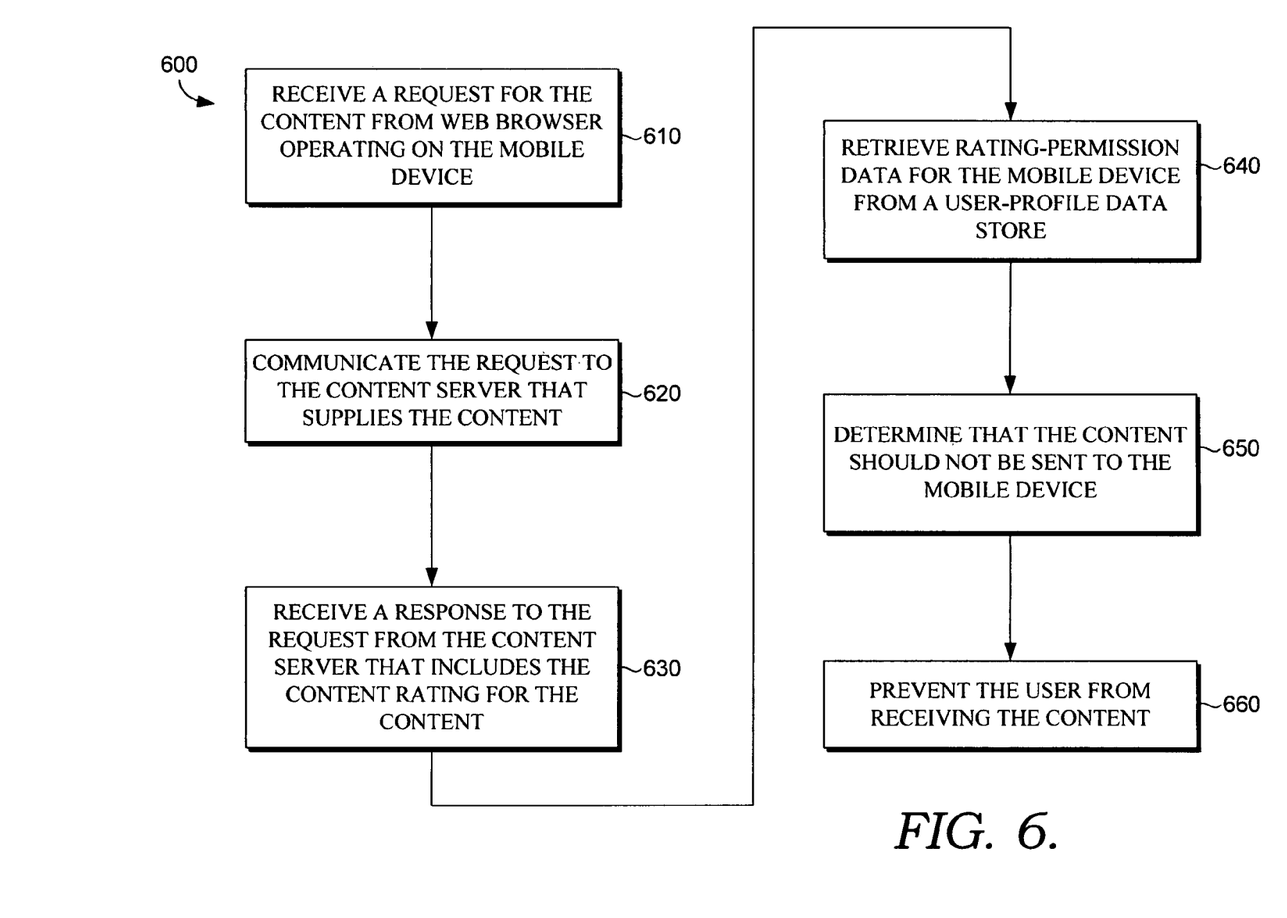
FIG. 6 is a flow diagram that illustrates a method of managing access to content requested by a web browser operating on a mobile device based on a content rating provided by the content's provider, in accordance with an embodiment of the present invention.

Turning now to FIG. 6, a flow diagram showing a method 600 that manages access to content requested by a web browser operating on a mobile device, based on a content rating supplied by the content provider is shown, in accordance with an embodiment of the present invention. At step 610, a request for the content is received from the web browser operating on the mobile device. In one embodiment, the message is received at a gateway, such as gateway 106 described previously with reference to FIG. 1. The request may be an HTTP Get request. The content requested may be a web page, video, digital picture, or other object.

At step 620, the request is communicated to the content server that supplies the content. In one embodiment, the request is communicated by the gateway to a content server designated in the initial request. A content server may be identified by its association with a particular IP address or URL.

At step 630, a response to the request is received from the content server. The response includes a content rating for the requested content. In one embodiment, the content rating is in the header of the response. At step 640, rating permission data is retrieved for the mobile device. The rating-permission data may be retrieved from a device-profile data store embodied on one or more computer-readable media. The device-profile data store may be similar to the device-profile data store 108 described previously with reference to FIG. 1. As described previously with reference to FIG. 2, the rating-permission data for a device may be retrieved using a unique identifier associated with the mobile device. The rating-permission data is in the same format as the content rating provided in step 630 so that an in-kind comparison can be made.

In one embodiment, the content rating and the rating-permission data operates on a scale. Thus, a mobile device may be granted access to any content with a content rating above 5, for example. The user would then be denied access to content associated with a content rating below 5. In another embodiment, the content rating and the ratings-permission data is matched on a one-to-one basis. For example, the ratings-permission data may grant a mobile device access to content associated with a content rating of 1, 5, 8, 10, 11, or 15. The mobile device would be excluded from accessing content with any ratings not specifically included. In another embodiment, the converse operation is used, such that the mobile device is excluded from certain designated ratings.

At step 650, the mobile device is determined not to have access to the content based on the rating-permission data and the content rating provided by the content server. This determination has been described previously. At step 660, the mobile device is prevented from receiving the content. The mobile device is prevented from receiving the content because of the determination made in step 650. In one embodiment, the mobile device is provided a notification indicating that access to the content has been denied.

Figure 7:
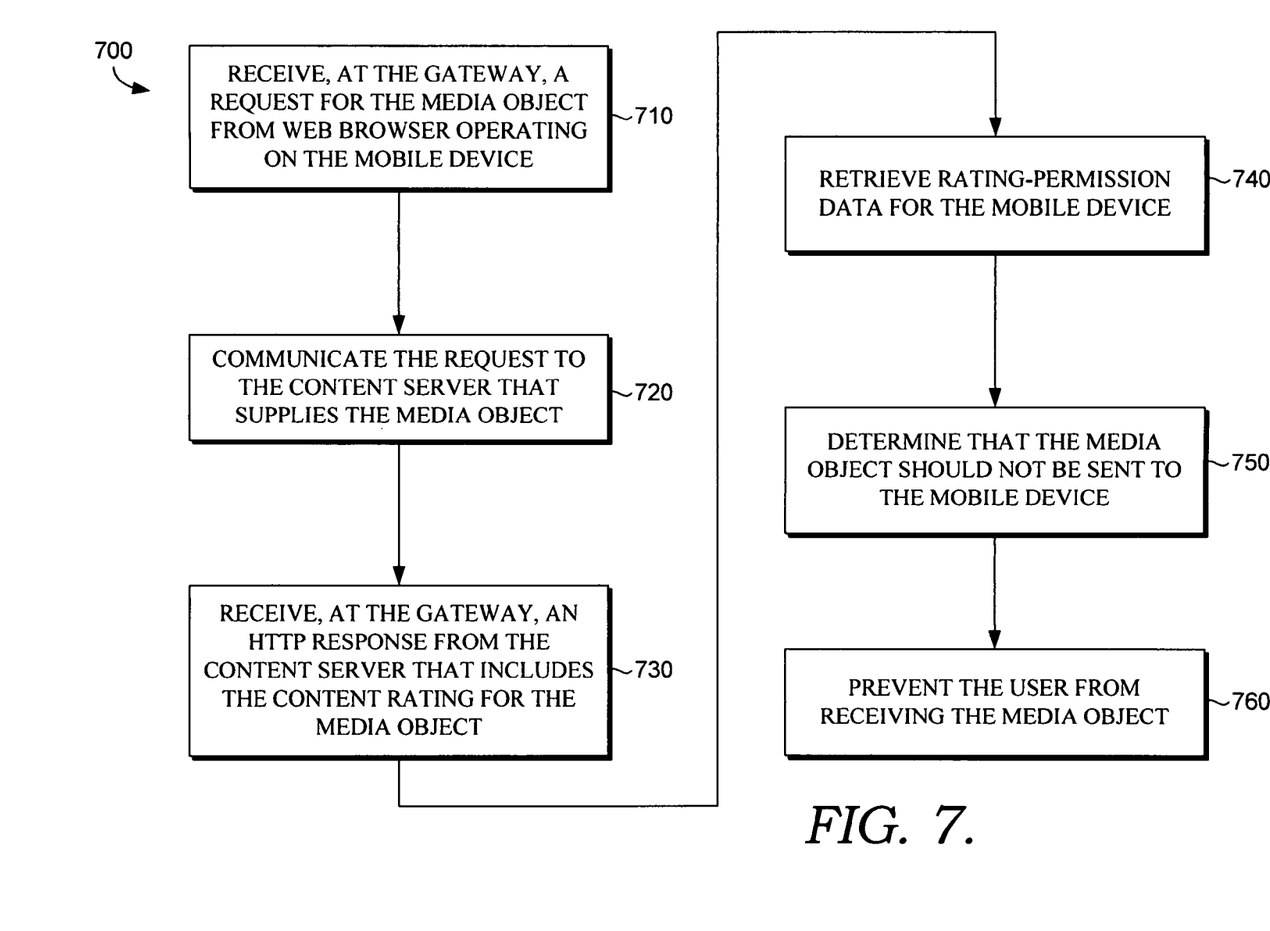
FIG. 7 is a flow diagram that illustrates a method that allows a gateway to manage access to media objects requested by a web browser operating on a mobile device based on a content rating provided by the media object's provider, in accordance with an embodiment of the present invention.

Turning now to FIG. 7, a flow-diagram showing a method 700 that allows a gateway to block a media object requested by a web browser operating on a mobile device, based on a content rating supplied by a content provider that provided the media object is provided, in accordance with an embodiment of the present invention. The gateway may be similar to the gateway 106 described previously with reference to FIG. 1. The media objects may include a picture, video, or other object embedded in a web page. In one embodiment, the media objects are retrieved based on a specific request when a web page is rendered. At step 710, a request is received at the gateway for the media object. The request is sent from a web browser operating on a mobile device associated with the access network of the gateway. As described previously, the gateway is a computing device that acts as interface between mobile devices connected to an access network and computing devices on a public network, such as the Internet. At step 720, the request is communicated to the content server that supplies the media object. The content server may be similar to content server 114 described previously with reference to FIG. 1. At step 730, the gateway receives a response from the content server that includes the content rating for the media object. At step 740, the rating-permission data is retrieved for the mobile device. The rating-permission data may be retrieved from a device-profile data store embodied on one or more computer-readable media. At step 750, it is determined that the mobile device does not have access to the media object based on the rating-permission data and the content rating. At step 760, the mobile device is prevented from receiving the media object.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. One or more nontransitory computer-readable media having computer-executable instructions embodied thereon that, when executed, perform a method of providing a content rating that enables a requesting computing device to restrict user access to requested digital content using the content rating, the method comprising:

at a content server, receiving the digital content from a digital-content provider that generated the digital content, wherein the digital content is a web page;

at the content server, receiving the content rating associated with the web page that indicates a nature of the web page, wherein the content rating is received from the digital-content provider that generated the web page;

at the content server, storing the web page in a ratings database in a memory coupled to the content server, wherein:

the memory contains directories that are pre-associated with particular content ratings;

storing the web page includes storing the web page in a directory that is pre-associated with the content rating; and         other digital content stored in the directory is associated with the content rating;

from a requesting computing device, receiving a request for the web page;

generating a hypertext transport protocol (HTTP) response that includes the web page and the content rating associated with the web page, wherein the content rating is communicated through an attribute value in an HTTP header of the HTTP response that includes the web page and wherein generating the response includes determining the content rating associated with the web page based on the directory in which the web page is stored; and communicating the response to the requesting computing device, such that the requesting computing device is able to restrict user access to the web page using the content rating.

2. The media of claim 1, wherein the request is an HTTP Get request and the response is an HTTP 200 response.

3. The media of claim 1, the method further comprising:
subsequent to receiving the request for the web page, receiving a second request for a second digital content, wherein the second digital content is one or more of a picture or a video that is included in the web page;
generating a second response that includes a second content rating associated with the picture or video, wherein the second content rating associated with the picture or video is independent of the content rating associated with the web page; and
communicating the second response to the requesting computing device, wherein the second content rating included in the second response enables user access to the picture or video to be restricted independently of user access to the web page.

4. The media of claim 1, wherein the content rating indicates age appropriateness of the digital content.

5. One or more nontransitory computer-readable media having computer-executable instructions embodied thereon that, when executed, perform a method that determines whether a particular content should be communicated to a mobile device based on a content rating supplied by a provider of the particular content and a rating permission associated with the mobile device, the method comprising:
receiving, at a gateway, by way of a base station in a mobile communications network, a request for a content, wherein the request is received from a web browser operating on the mobile device, wherein the gateway is associated with the mobile communications network, and wherein the gateway acts as an interface between a plurality of mobile devices connected to the mobile communications network and computing devices on a public network;
communicating the request to a content server that supplies the content;
receiving, at the gateway, a response from the content server that includes the content rating supplied by the provider of the content, wherein the response is generated from determining the content rating associated with the content based on directories in the memory that are pre-associated with particular content and content ratings;
at the gateway that acts as the interface between the plurality of mobile devices connected to the mobile communications network and computing devices on the public network, retrieving rating-permission data for the mobile device from a device-profile data store embodied on one or more computer-readable media coupled to the gateway;
at the gateway, determining, based on the rating-permission data and the content rating provided by the content server, that the content should not be sent to the mobile device; and
at the gateway, prior to transmitting the content to the mobile device via the base station, preventing the mobile device from receiving the content.

6. The media of claim 5, wherein the request is an HTTP Get request and the response is an HTTP 200 response.

7. The media of claim 6, wherein the content rating is communicated through an attribute value in a message header.

8. The media of claim 5, wherein the content is a picture that is included in a web page requested by the web browser.

9. The media of claim 5, wherein the method further comprises sending a restriction notice to the web browser that indicates a user of the mobile device does not have access to the digital content.

10. The media of claim 5, wherein the content rating indicates age appropriateness of the content.

11. One or more nontransitory computer-readable media having computer-executable instructions embodied thereon that, when executed, perform a method that allows a gateway to restrict user access to a media object requested by a web browser operating on a mobile device based on a content rating supplied by a content provider that provided the media object, the method comprising:
receiving, at the gateway, by way of a base station in a mobile communications network, a request for the media object, wherein:
the media object is an object that is embedded in a web page;
the request for the media object is a different request than a request for the web page on which the media object is embedded;
the request is received from the web browser operating on the mobile device; and
the gateway is a computing device that acts as an interface between a plurality of mobile devices connected to the mobile communications network and computing devices on a public network;
communicating the request from the gateway to a content server that supplies the media object;
receiving, at the gateway, a hypertext transport protocol (HTTP) response from the content server that includes the media object and the content rating supplied by the content provider that provided the media object, wherein the content rating is communicated through an attribute value in an HTTP header of the HTTP response that includes the media object and wherein the content rating of the media object is independent of a content rating of the web page;
at the gateway that acts as the interface between the plurality of mobile devices connected to the mobile communications network and computing devices on the public network, retrieving rating-permission data for the mobile device from a device-profile database embodied in computer memory coupled to the gateway;
at the gateway, prior to transmitting the content to the mobile device via the base station in the mobile communications network, determining, based on the rating-permission data for the mobile device and the content rating provided by the content server, that the media object should not be sent to the mobile device and determining, based on the rating-permission data for the mobile device and the content rating of the web page, that the web page may be sent to the mobile device;
permitting the web page to be sent to the mobile device; and
preventing the mobile device from receiving the media object, thereby preventing a user of the mobile device from accessing the media object based on the content rating.

12. The media of claim 11, wherein the media object is a video.

13. The media of claim 11, wherein the rating indicates nature of the content.

14. The media of claim 11, wherein the method further comprises:
- receiving the rating-permission data, wherein the rating-permission data includes information identifying the mobile device to which the rating-permission data applies; and
- storing the rating-permission data in the device-profile database.

15. The media of claim 11, wherein the request includes identification information for the mobile device, and wherein the method further includes using the identification information to identify the rating-permission data that applies to the mobile device.

16. The media of claim 11, wherein the method further includes communicating a notification message to the mobile device indicating that the media object has been blocked.

* * * * *